Aug. 16, 1932.  B. T. ANDREN  1,872,386
AUTOMOBILE FRAME
Filed May 2, 1930  2 Sheets-Sheet 1

INVENTOR.
Birger T. Andren
BY
ATTORNEY.

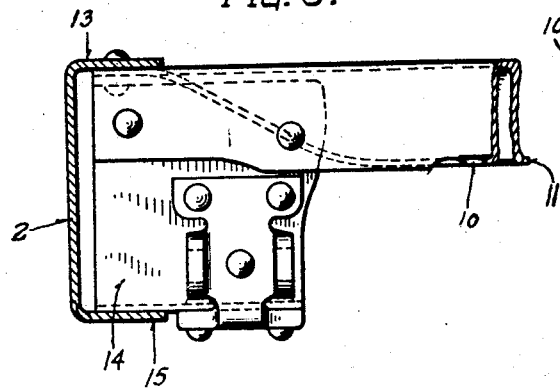
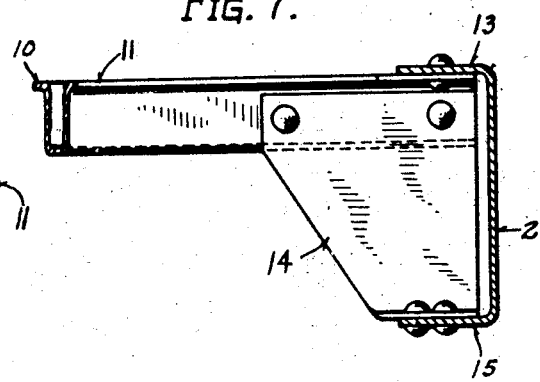
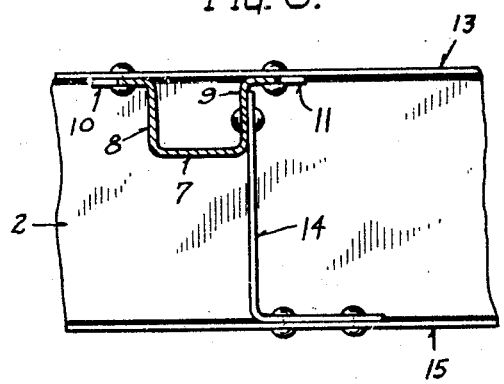
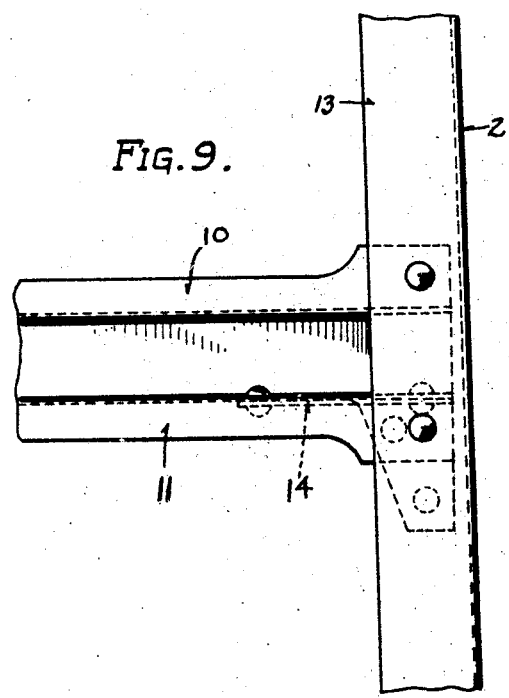

Patented Aug. 16, 1932

1,872,386

UNITED STATES PATENT OFFICE

BIRGER T. ANDREN, OF MILWAUKEE, WISCONSIN, ASSIGNOR TO A. O. SMITH CORPORATION, OF MILWAUKEE, WISCONSIN, A CORPORATION OF NEW YORK

AUTOMOBILE FRAME

Application filed May 2, 1930. Serial No. 449,236.

This invention relates to an automobile frame and has particular reference to a recent development in sheet metal cross bar and side bar construction and fabrication.

The object of the invention is to provide an automobile frame of improved more rigid construction and which may be more readily and economically manufactured.

Other objects will appear hereinafter with reference to preferred and modified forms of the invention as illustrated in the accompanying drawings.

In the drawings:

Fig. 6 is a rear view of the cross bar showing a modified form of spring hanger attachment.

Fig. 7 is the same as Fig. 2 showing a modified form of cross bar.

Fig. 8 is similar to Fig. 3 but showing the modified form of cross bar.

Fig. 9 is similar to Fig. 4 but showing the modified form of cross bar.

Figure 1:
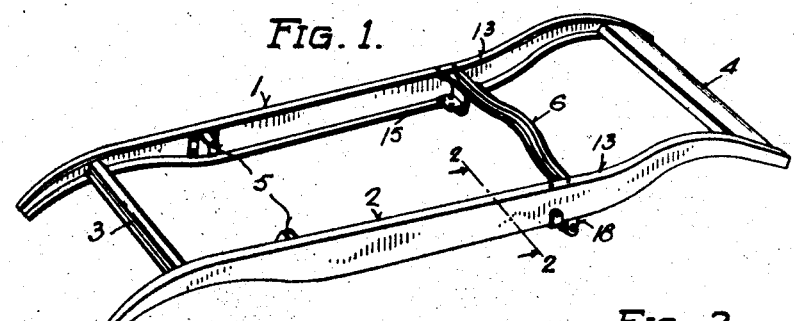
Figure 1 is a perspective view of the frame.

The automobile frame, as preferably constructed, has two opposing channel side bars 1 and 2, and front and rear cross bars 3 and 4, respectively, connecting said side bars.

The front cross bar 3 provides the support for the front end of the automobile engine and a rear engine support is provided as at 5 on each side bar.

The rear cross bar 4 provides a support for the automobile body at the rear end.

An auxiliary strengthening cross bar 6 is employed intermediate the rear cross bar 4 and the engine supports 5, and is positioned approximately at the point where the forward ends of the rear springs are attached to the side bars.

The construction of the auxiliary bar 6 and its attachment to the side bars constitute the essence of the present invention, although the cross bar may be employed as a front or rear cross bar, or be placed at any suitable location in the frame.

The cross bar 6 is preferably of inverted channel shape with the bottom 7 of the channel extending horizontally in transverse section and the flanges 8 and 9 on either side extending vertically downwardly.

The cross bar also has horizontal webs 10 and 11 extending horizontally at the lower edge of the flanges 8 and 9, respectively.

At each end of the cross bar, the flange 9 and web 11 are flattened out into the same plane as the channel bottom 7 to form an integral gusset 12 for attachment to the upper flange 13 of the side bar. The other flange 8 and web 10 extend downwardly and have attached thereto a plate 14 which forms a brace between the cross bar and the lower flange 15 of the side bar.

Figure 2:
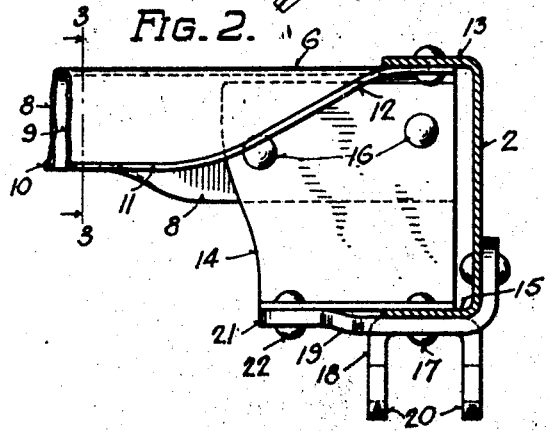
Fig. 2 is a transverse central section on line 2—2 of Figure 1.
Figure 3:
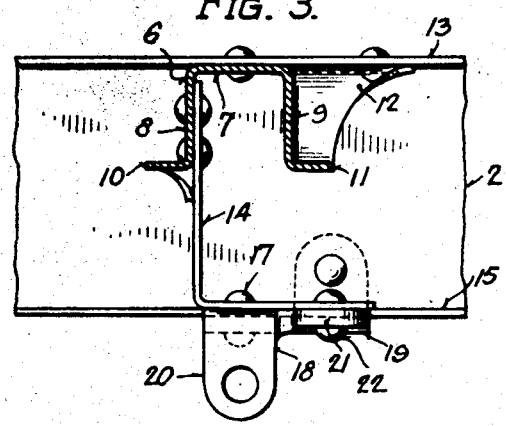
Fig. 3 is a section on line 3—3 of Fig. 2.
Figure 4:
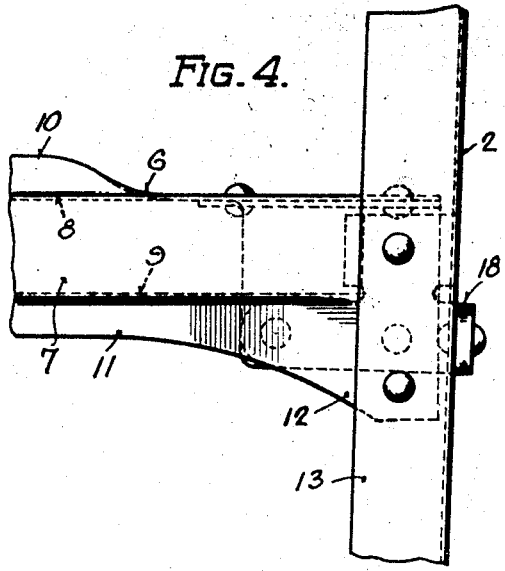
Fig. 4 is a top plan view of the connection between the cross bar and side bar.
Figure 5:
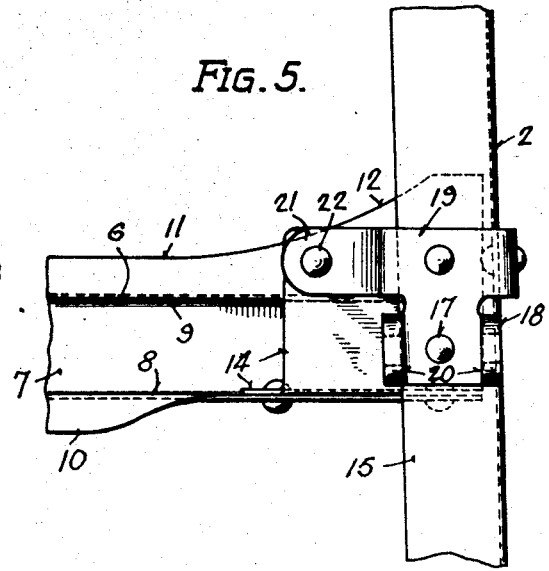
Fig. 5 is a bottom view of the same showing the spring hanger.

The plate 14 is riveted as at 16 to the flange 8 of the cross bar. At its lower end, the plate is bent horizontally and has a rivet 17 passing therethrough and through the lower flange of the frame and through the spring hanger 18 to secure said parts together. As shown in Figs. 2, 6, and 7, the plate 14 is disposed between the flanges 13 and 15 of the side bar and acts as a reenforcement therefor, as well as constituting a brace between the cross bar and side bar.

The spring hanger 18 is preferably of sheet metal construction and has a base 19 with downwardly extending shackle members 20 for receiving the spring shackle bolt and a horizontal lateral projection 21 extending inwardly of the frame.

The plate 14 is preferably of such width that the lower horizontal portion thereof may be riveted as at 22 to the lateral projection 21 of the spring hanger.

The projection 21 of the spring hanger may be bent upwardly to allow for the thickness of the flange 14 of the side bar between the plate and the spring hanger.

In the modified form shown in Fig. 6, the spring hanger is attached directly to the plate 13 and is supported thereby.

The cross bar 6 may be attached to the side bars of the frame at points other than where the forward end of the rear spring is attached thereto, as illustrated in the modified form of bar shown in Figs. 7, 8 and 9.

In this case the cross bar may be of channel shape throughout its entire length with the flanges turned upwardly so that the webs form an integral gusset without flattening of the end of the bar.

The plate 14 is attached to one flange of the cross bar and extends downwardly as before with the horizontal lower end riveted to the lower flange of the side bar.

The cross bar is riveted to the upper flange of the side bar through the webs 10 and 11. This construction provides a rigid brace which prevents twisting and deformation of the frame during use.

The invention may have various modification within the scope of the following claims.

I claim:

1. In an automobile frame, a channel side bar having horizontal flanges, a sheet metal channel cross bar having the flanges thereof extending in substantially vertical planes and having horizontal webs extending laterally from each flange, one flange of said cross bar being flattened at the end to provide a gusset for attachment to a flange of the side bar, and a vertically extending plate attached to the other flange of said cross bar and having a horizontal portion attached to the other flange of said side bar.

2. In an automobile frame, a channel side bar, a sheet metal channel cross bar having the flanges thereof extending in substantially vertical planes and having webs extending laterally from said flanges, one of said webs being attached at its end to one flange of said channel side bar and the other of said webs being bent into the plane of the flange of said cross bar at the end thereof, and a vertically extending plate attached to the last-mentioned web adjacent the end of the cross bar and having a horizontal portion attached to the other flange of said side bar.

3. In an automobile frame, two opposing channel side bars, each having upper and lower horizontal flanges, a channel cross bar having the flanges thereof extending in a substantially vertical plane, each end of said cross bar being attached to corresponding flanges of the opposite side bar, a plate extending in a substantially vertical plane transverse to said side bar and fastened to each end of said cross bar, each of said plates having a horizontal portion attached to the other flange of the respective side bars, and spring hangers attached to said plates.

4. In an automobile frame, two opposing channel side bars, each having upper and lower horizontal flanges, a channel cross bar having the flanges thereof extending in a substantially vertical plane, each end of said cross bar being attached to corresponding flanges of the opposite side bar, a plate extending in a substantially vertical plane transverse to said bar and fastened to each end of said cross bar, each of said plates having a horizontal portion attached to the other flange of the respective side bars, and spring hangers attached to said plates and to said side bars, said plate constituting a reenforcing means for said cross bar and said spring hanger.

5. In an automobile frame, a channel side bar, a sheet metal channel cross bar attached to the upper flange of said side bar, a plate extending in a vertical plane transverse to said side bar attached to said cross bar and having a horizontal portion adjacent the lower flange of said side bar, a spring hanger arranged on the under side of said lower flange of said cross bar, and a plurality of rivets passing through said spring hanger, said lower flange of said side bar and said horizontal portion of said plate to secure the same together.

6. In an automobile frame, a channel side bar, a sheet metal channel cross bar attached to the upper flange of said side bar, a plate extending in a vertical plane transverse to said side bar attached to said cross bar and having a horizontal portion adjacent the lower flange of said side bar, a spring hanger arranged on the under side of said lower flange of said cross bar, said spring hanger having an inward lateral projection riveted to the inner end of the horizontal portion of said plate, and a rivet passing through said spring hanger, said lower flange of said side bar and the outer end of the horizontal portion of said plate to secure the said parts together.

7. The combination with an automobile frame, comprising spaced channel side bars, of a cross member of channel shape having downwardly depending flanges and outwardly turned webs, the flange and web at one side only of the cross member being straightened to extend in a horizontal plane at each end providing a gusset, and means for securing the gussets at the ends of the cross member to the side bars of the frame.

8. In an automobile frame, a pair of oppositely disposed channel side bars having inwardly extending flanges, a cross member connecting the side bars, said cross member comprising a sheet metal strip bent to channel shape with depending flanges having outwardly turned webs at their lower edges, the flange and web at one side of the cross member at each end being straightened to extend in a horizontal plane to provide a gusset, the web at the other side of the cross member at each end being straightened to extend in a vertical plane, means for securing the gussets to the upper flanges of the side bars, and a reenforcing plate of L-shape attached to the vertical portion at each end of the cross member and to the lower flange of each side bar respectively.

9. In an automobile frame, a pair of oppositely disposed channel side bars having inwardly extending flanges, a spring hanger attached to the lower flange of each side bar, a cross member connecting the side bars, said cross member comprising a sheet metal strip bent to channel shape with depending flanges having outwardly turned webs at their lower edges, the flange and web at one side of the cross member at each end being straightened to extend in a horizontal plane to provide a gusset, the web at the other side of the cross member at each end being straightened to extend in a vertical plane, means for securing the gussets to the upper flanges of the side bars at positions above the spring hangers, and a reenforcing plate of L-shape at each end of the cross member attached to the vertical portion of the cross member and to the lower flange of each side bar respectively above the spring hanger to transmit force from the spring hanger to the upper flange of the side bar.

In witness whereof I have hereunto subscribed my name at Milwaukee, Wisconsin, this 29th day of April, 1930.

BIRGER T. ANDREN.